United States Patent
Teng et al.

(10) Patent No.: US 10,049,245 B2
(45) Date of Patent: Aug. 14, 2018

(54) LASER SCANNING CODE SYMBOL READING SYSTEM PROVIDING CONTROL OVER LENGTH OF LASER SCAN LINE PROJECTED ONTO A SCANNED OBJECT USING DYNAMIC RANGE-DEPENDENT SCAN ANGLE CONTROL

(75) Inventors: Zhipeng Teng, Jiangsu (CN); Haixi Wang, Jiangsu (CN)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 14/403,846

(22) PCT Filed: Jun. 20, 2012

(86) PCT No.: PCT/CN2012/000783
§ 371 (c)(1),
(2), (4) Date: Dec. 30, 2014

(87) PCT Pub. No.: WO2013/188990
PCT Pub. Date: Dec. 27, 2013

(65) Prior Publication Data
US 2015/0144698 A1 May 28, 2015

(51) Int. Cl.
G06K 7/10 (2006.01)
G06K 9/36 (2006.01)
G06K 9/80 (2006.01)

(52) U.S. Cl.
CPC ..... G06K 7/10594 (2013.01); G06K 7/10722 (2013.01); G06K 7/10792 (2013.01); G06K 7/10801 (2013.01)

(58) Field of Classification Search
CPC .. G06K 7/14; G06K 7/10881; G06K 7/10594; G06K 7/10722; G06K 7/10792; G06K 7/10801

(Continued)

(56) References Cited

U.S. PATENT DOCUMENTS 5,340,971 A 8/1994 Rockstein et al.
5,386,107 A 1/1995 Dvorkis et al.
(Continued)

FOREIGN PATENT DOCUMENTS

CN 1412712 A 4/2003
CN 101253510 A 8/2008
(Continued)

OTHER PUBLICATIONS

Chinese First Office Action in related CN Application No. 201280074087.6; dated Jul. 26, 2016, 26 Pages, English Translation provide. [New references cited only; U.S. Publication 2010/0308115A1 was previously cited in this application].

(Continued)

Primary Examiner — Laura Gudorf
(74) Attorney, Agent, or Firm — Additon, Higgins & Pendleton, P.A.

(57) ABSTRACT

Method of and system for reading bar code symbols using a hand-supportable laser scanning bar code symbol reading system supporting an improved level control over the length of laser scan lines projected onto scanned objects, at any instant in time, in a manner dependent the detected location, distance or range of the scanned object in the scanning field of the system during system operation. The length characteristics of the laser scan line are controlled by setting the laser scan sweep angle as a function of detected or estimated distance or range of the object from the system. In the illustrative embodiment, the laser scan sweep angle is controlled by supplying a drive current to the scanning mechanism, as a function of detected or estimated distance or range of the object from the scanning system.

20 Claims, 9 Drawing Sheets

(58) Field of Classification Search
USPC .................................................. 235/462.1
See application file for complete search history.

(56) References Cited

U.S. PATENT DOCUMENTS

| | | | |
|---|---|---|---|
| 6,478,224 B1 * | 11/2002 | Gettys | G06K 7/14 235/462.16 |
| 6,832,725 B2 | 12/2004 | Gardiner et al. | |
| 7,128,266 B2 | 10/2006 | Marlton et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Suzhou et al. | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,736,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Bremer et al. | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |
| 8,903,172 B2 | 12/2014 | Smith | |
| 8,908,995 B2 | 12/2014 | Benos et al. | |
| 8,910,870 B2 | 12/2014 | Li et al. | |
| 8,910,875 B2 | 12/2014 | Ren et al. | |
| 8,914,290 B2 | 12/2014 | Hendrickson et al. | |
| 8,914,788 B2 | 12/2014 | Pettinelli et al. | |
| 8,915,439 B2 | 12/2014 | Feng et al. | |

(56) References Cited

U.S. PATENT DOCUMENTS

| | | | |
|---|---|---|---|
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 2007/0047605 A1 | 3/2007 | Barkan |
| 2007/0063048 A1 | 3/2007 | Havens et al. |
| 2007/0069027 A1* | 3/2007 | Madej ............... G06K 7/10851 235/462.32 |
| 2008/0023552 A1* | 1/2008 | Gillet ............... G02B 26/0825 235/462.36 |
| 2008/0230611 A1* | 9/2008 | Sprague ............... H02K 33/08 235/462.22 |
| 2009/0114727 A1* | 5/2009 | Heinrich ............ G06K 7/10732 235/462.25 |
| 2009/0134221 A1 | 5/2009 | Zhu et al. |
| 2010/0127081 A1 | 5/2010 | Kearney |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0308115 A1* | 12/2010 | Liou .................. G06K 7/10881 235/462.22 |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0295637 A1* | 11/2012 | Hannuksela .......... G01S 3/8034 455/456.1 |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |

(56) References Cited

U.S. PATENT DOCUMENTS

| | | |
|---|---|---|
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |

FOREIGN PATENT DOCUMENTS

| | | |
|---|---|---|
| EP | 1560150 B1 | 11/2008 |
| JP | 2011154312 A | 8/2011 |
| WO | 2013163789 A1 | 11/2013 |
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 14/519,179 for Dimensioning System With Multipath Interference Mitigation filed Oct. 21, 2014 (Thuries et al.); 30 pages.

U.S. Appl. No. 14/264,173 for Autofocus Lens System for Indicia Readers filed Apr. 29, 2014, (Ackley et al.); 39 pages.

U.S. Appl. No. 14/453,019 for Dimensioning System With Guided Alignment, filed Aug. 6, 2014 (Li et al.); 31 pages.

U.S. Appl. No. 14/452,697 for Interactive Indicia Reader, filed Aug. 6, 2014, (Todeschini); 32 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 14/715,916 for Evaluating Image Values filed May 19, 2015 (Ackley); 60 pages.

U.S. Appl. No. 14/513,808 for Identifying Inventory Items in a Storage Facility filed Oct. 14, 2014 (Singel et al.); 51 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 14/483,056 for Variable Depth of Field Barcode Scanner filed Sep. 10, 2014 (McCloskey et al.); 29 pages.

U.S. Appl. No. 14/531,154 for Directing an Inspector Through an Inspection filed Nov. 3, 2014 (Miller et al.); 53 pages.

U.S. Appl. No. 29/525,068 for Tablet Computer With Removable Scanning Device filed Apr. 27, 2015 (Schulte et al.); 19 pages.

(56) References Cited

OTHER PUBLICATIONS

U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User'S Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Bamdringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.
International Search Report of Parent PCT/CN2012/000783, dated Mar. 28, 2013, 2 pages.
U.S. Appl. No. 13/367,978, filed Feb. 7, 2012, (Feng et al.); now abandoned.
U.S. Appl. No. 14/462,801 for Mobile Computing Device With Data Cognition Software, filed Aug. 19, 2014 (Todeschini et al.); 38 pages.
U.S. Appl. No. 14/596,757 for System and Method for Detecting Barcode Printing Errors filed Jan. 14, 2015 (Ackley); 41 pages.
U.S. Appl. No. 14/277,337 for Multipurpose Optical Reader, filed May 14, 2014 (Jovanovski et al.); 59 pages.
U.S. Appl. No. 14/200,405 for Indicia Reader for Size-Limited Applications filed Mar. 7, 2014 (Feng et al.); 42 pages.
U.S. Appl. No. 14/662,922 for Multifunction Point of Sale System filed Mar. 19, 2015 (Van Horn et al.); 41 pages.
U.S. Appl. No. 14/446,391 for Multifunction Point of Sale Apparatus With Optical Signature Capture filed Jul. 30, 2014 (Good et al.); 37 pages.
U.S. Appl. No. 29/528,165 for In-Counter Barcode Scanner filed May 27, 2015 (Oberpriller et al.); 13 pages.
U.S. Appl. No. 29/528,890 for Mobile Computer Housing filed Jun. 2, 2015 (Fitch et al.); 61 pages.
U.S. Appl. No. 14/614,796 for Cargo Apportionment Techniques filed Feb. 5, 2015 (Morton et al.); 56 pages.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 14/578,627 for Safety System and Method filed Dec. 22, 2014 (Ackley et al.); 32 pages.
U.S. Appl. No. 14/573,022 for Dynamic Diagnostic Indicator Generation filed Dec. 17, 2014 (Goldsmith); 43 pages.
U.S. Appl. No. 14/529,857 for Barcode Reader With Security Features filed Oct. 31, 2014 (Todeschini et al.); 32 pages.
U.S. Appl. No. 14/519,195 for Handheld Dimensioning System With Feedback filed Oct. 21, 2014 (Laffargue et al.); 39 pages.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/533,319 for Barcode Scanning System Using Wearable Device With Embedded Camera filed Nov. 5, 2014 (Todeschini); 29 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.

(56) References Cited

OTHER PUBLICATIONS

U.S. Appl. No. 14/580,262 for Media Gate for Thermal Transfer Printers filed Dec. 23, 2014 (Bowles); 36 pages.
Extended European Search Report in related EP Application No. 12879197.7, dated Mar. 2, 2016, 9 pages.
Chinese Third Office Action in related CN Application No. 201280074087.6; dated Aug. 11, 2017, 4 Pages.
English-translation of Chinese Third Office Action in related CN Application No. 201280074087.6; dated Aug. 11, 2017, 7 Pages.
Chinese Second Office Action in related CN Application No. 201280074087.6; dated Apr. 12, 2017, 11 Pages [All references previously cited].
English-translation of Chinese Second Office Action in related CN Application No. 201280074087.6; dated Apr. 12, 2017, 11 Pages.

\* cited by examiner

LASER SCANNING CODE SYMBOL READING SYSTEM PROVIDING CONTROL OVER LENGTH OF LASER SCAN LINE PROJECTED ONTO A SCANNED OBJECT USING DYNAMIC RANGE-DEPENDENT SCAN ANGLE CONTROL

BACKGROUND

Field of Disclosure

The present disclosure relates to an improved method of and apparatus for reading bar code symbols in diverse scanning environments using laser scanning beam technology.

Brief Overview of the State of the Art

It is well known that the depth of field (DOF) of a laser scanning system is limited by the bandwidth and amplitude of the electrical scan data signal generated while scanning a laser beam across a code symbol located at a distance from the scanning.

For example, in a fixed scan speed/sweep scanning system, if the laser beam scans an object located a long distance from the scanning system, then the velocity of the laser beam across the object will be very high. Consequently, the signal amplitude received at the scanning system will be relative weak (because of the long distance traveled), and the signal frequency bandwidth will be very high due to the high velocity of the laser beam across the code structure.

Also, in a fixed scan speed/sweep scanning system, if the laser beam scans an object located a short distance from the scanning system, then the velocity of the laser beam across the object will be lower than when scanning long distance objects. Consequently, the signal amplitude received at the scanning system will be relative strong (because of the short distance traveled), and the signal frequency bandwidth will be relatively lower due to the low velocity of the laser beam across the code structure.

Such laser scanning performance characteristics of conventional fixed scanning systems create additional signal processing bandwidth requirements within the analog signal processing stage of conventional laser scanning systems. In turn, this complicates the design and increases the cost of such conventional laser scanning systems.

There is a great need in the art to provide a novel laser scanning code symbol reading system and method supporting an improved level control over the length of laser scan lines projected onto scanned objects, while maintaining the return signal bandwidth relatively constant during scanning operations, and avoiding the shortcomings and drawbacks of prior art methodologies and apparatus.

OBJECTS OF PRESENT DISCLOSURE

A primary object of the present disclosure is to provide a hand-supportable laser scanning code symbol reading system supporting an improved level of control over the length of a laser scan line in the scanning field, without the shortcomings and drawbacks of prior art apparatus and methodologies.

Another object is to provide a laser scanning code symbol reading system supporting an improved level control over the length of laser scan lines projected onto scanned objects, while maintaining the return signal bandwidth relatively constant during scanning operations.

Another object is to provide such a laser scanning code symbol reading system, wherein the length characteristics of a laser scan line are controlled by setting the laser scan sweep angle as a function of detected or estimated distance or range of the object from the system.

Another object is to provide such a laser scanning code symbol reading system, wherein laser scan sweep angle is controlled by supplying a drive current to the scanning mechanism, as a function of detected or estimated distance or range of the object from the scanning system.

Another object is to provide a laser scanning bar code symbol reading system having the capacity to automatically control the length of a projected laser scan line from a laser source, at any instant in time, in a manner dependent the detected location, distance or range of the scanned object in the scanning field of the system during system operation.

Another object of the present disclosure is to provide a new and improved laser scanning code symbol reading system that automatically measures or estimates the distance or range between the laser scanning system and the scanned object, and then automatically adjusts the scan sweep angle of the laser scanning beam, as a function of object distance or range.

Another object is to provide a laser scanning code symbol reading system that offers better depth of field (DOF) performance in both the near-field (i.e. short distance) and far-field (i.e. long distance) portions of the laser scanning field.

Another object is to provide an improved method of laser scanning bar code symbols by detecting the location of the scanned object in the field of view of the system, and automatically controlling the length of a projected laser scan line from a laser source, at any instant in time, based on the detected scanning location.

Further objects of the present disclosure will become more apparently understood hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying Drawings, wherein.

DETAILED DESCRIPTION OF THE ILLUSTRATIVE EMBODIMENTS

Figure 1:
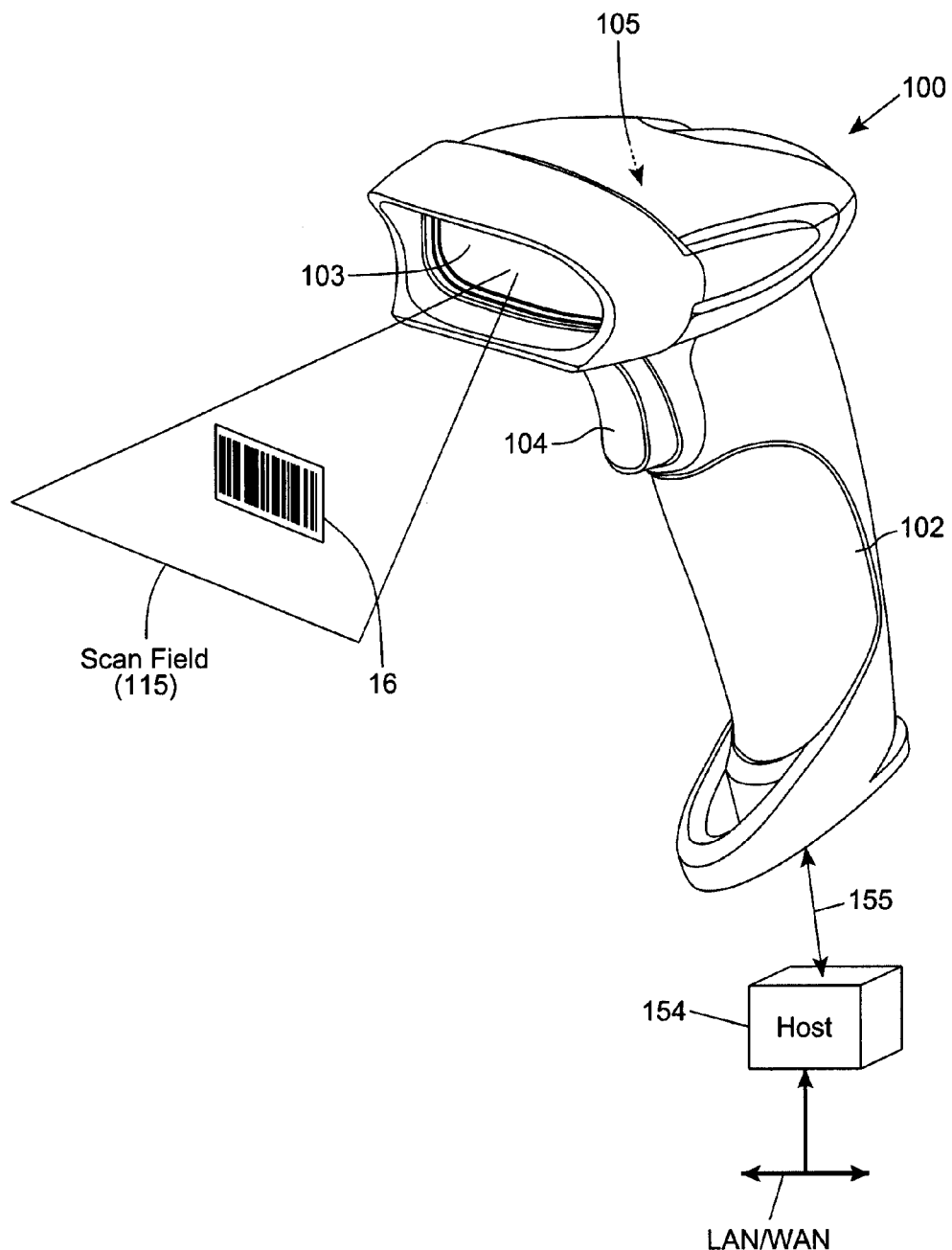
FIG. 1 is a perspective view of a first illustrative embodiment of a manually-triggered hand-supportable laser scanning bar code symbol reading system having the capacity to automatically control the length of a projected laser scan line at any instant in time, in a manner dependent on the determined/estimated range of the scanned object in the scanning field of the system during system operation.

Referring to the figures in the accompanying Drawings, the illustrative embodiments of the dual laser-scanning bar code symbol reading system and will be described in great detail, wherein like elements will be indicated using like reference numerals.

Manually-Triggered Hand-Supportable Laser Scanning Code Symbol Reading System Employing Dynamically-Programmed Laser Scanning Angle Control Referring now to FIGS. 1 through 5, a first illustrative embodiment of a manually-triggered hand-supportable laser scanning bar code symbol reading system 1 will be described in detail.

Figure 2:
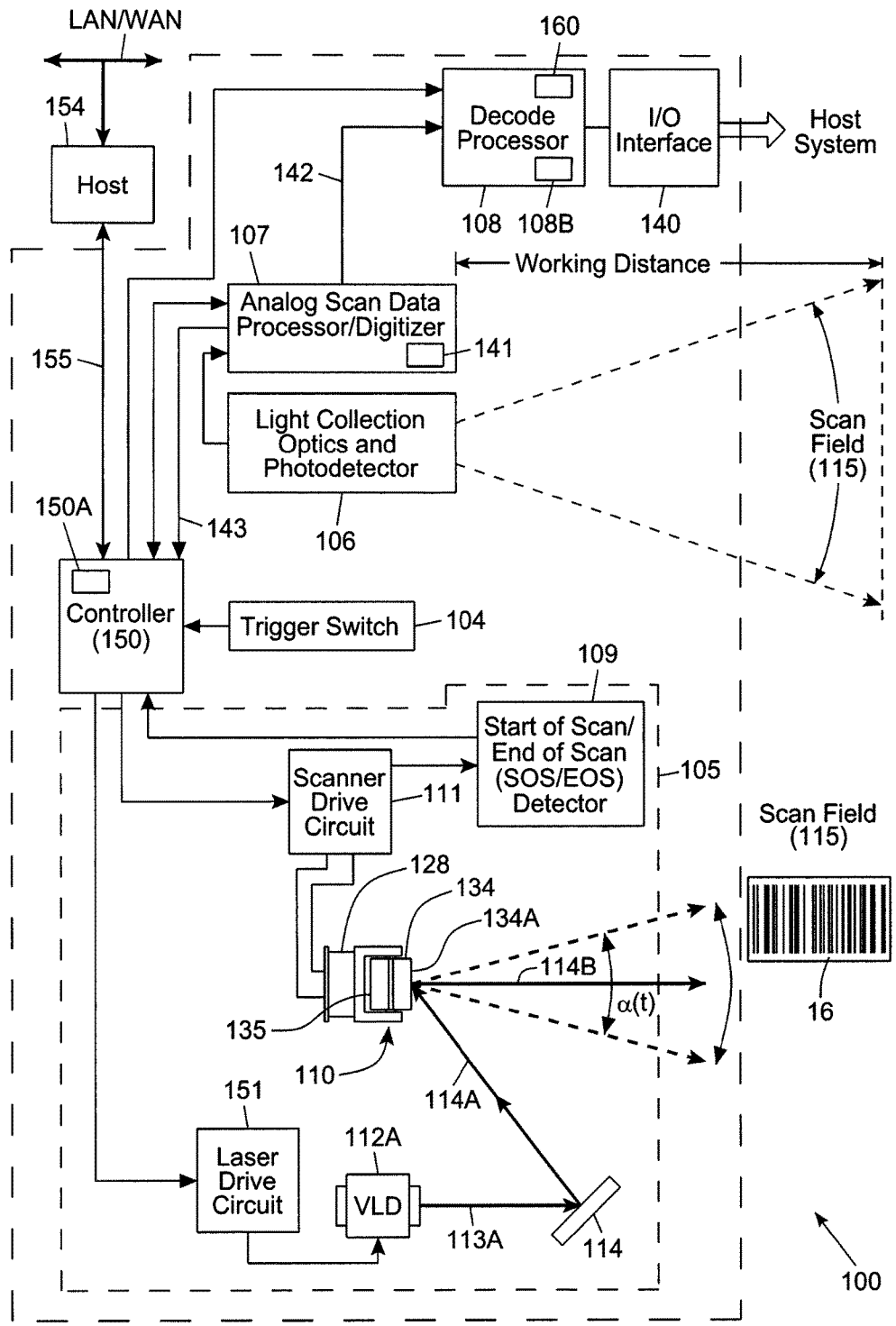
FIG. 2 is a schematic block diagram describing the major system components of the manually-triggered laser scanning bar code symbol reading system illustrated in FIG. 1.
Figure 3:
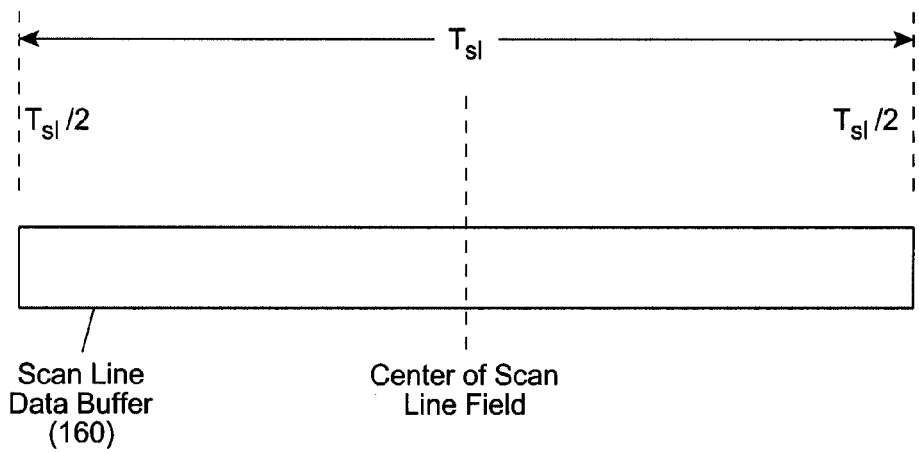
FIG. 3 is a schematic representation of a scan line data buffer maintained by the decode processor of the system of FIG. 1 during laser scanning operations, and holding a line of digital scan data for each laser scan direction during each laser scanning cycle.

As shown in FIGS. 1 and 2, the manually-triggered laser scanning bar code symbol reader 100 has a working distance, and an assembly of components comprising: a hand-supportable housing 102 having a head portion and a handle portion supporting the head portion; a light transmission window 103 integrated with the head portion of the housing 102; a manually-actuated trigger switch 104 integrated with the handle portion of the housing, for generating a trigger event signal to activate laser scanning module 105 with laser scanning field 115; a laser scanning module 105, for repeatedly scanning, across the laser scanning field, a visible laser beam generated by a laser source 112 (e.g. VLD or IR LD) having optics to produce a laser scanning beam focused in the laser scanning field, in response to control signals generated by a system controller 150; wherein the laser scanning module 105 also includes a laser drive circuit 151 for receiving control signals from system controller 150, and in response thereto, generating and delivering laser (diode) drive current signals to the laser source 112A; a start of scan/end of scan (SOS/EOS) detector 109, for generating timing signals indicating the start of laser beam sweep, and the end of each laser beam sweep, and sending these SOS/EOS timing signals to the system controller 150, as well as decode processor 108; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digital scan data signals, which are then converted into digital words representative of the relative width of the bars and spaces in the scanned code symbol structure and transmitted to decode processor 108 via lines 142; a scan data signal intensity detection module 141, preferably implemented within scan data processor/digitizer 107, for continuously (i) processing the return analog (or digital) scan data signals, (ii) detecting and analyzing the intensity (i.e. magnitude) of the laser return signal, (iii) determining (e.g. estimating) the range or distance of the scanned object, relative to the scanning window, and then (iv) transmitting the range indication (i.e. estimation) signal (e.g. in the form of a digital data value) to the controller 150 via lines 143 so that it can program or set an appropriate scan angle α(t) for the scanning assembly 110 to controlled by the scanner drive circuit 111 by the amplitude of the drive current supplied to the electromagnetic coil 128; a set of scan line data buffers 160 for buffering each complete line of scan data collected during a complete sweep of the laser scanning beam across the laser scanning field during each scanning cycle (e.g. two scan data line buffers for buffering data collected during scanning directions); programmed decode processor 108 for decode processing digitized data stored in said scan line data buffer 160, and generating symbol character data representative of each bar code symbol scanned by the laser scanning beam; an input/output (I/O) communication interface module 140 for interfacing with a host communication system 154 and transmitting symbol character data thereto via wired or wireless communication links 155 that are supported by the symbol reader and host system 154; and a system controller 150 for generating the necessary control signals for controlling operations within the hand-supportable laser scanning bar code symbol reading system.

As shown in FIG. 2, the laser scanning module 105 comprises a number of subcomponents, namely: laser scanning assembly 110 with an electromagnetic coil 128 and rotatable scanning element (e.g. mirror) 134 supporting a lightweight reflective element (e.g. mirror) 134A; a coil drive circuit 111 for generating an electrical drive signal to drive the electromagnetic coil 128 in the laser scanning assembly 110; and a laser beam source 112A for producing a visible laser beam 113A; and a beam deflecting mirror 114 for deflecting the laser beam 113A as incident beam 114A towards the mirror component of the laser scanning assembly 110, which sweeps the deflected laser beam 114B across the laser scanning field and a bar code symbol 16 that might be simultaneously present therein during system operation.

As shown in FIG. 2, the laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135) and which is driven by a scanner drive circuit 111 so that it generates magnetic forces on opposite poles of the permanent magnet 135, during scanning assembly operation. Assuming the properties of the permanent magnet 135 are substantially constant, as well as the distance between the permanent magnet 135 and the electromagnetic coil 128, the force exerted on the permanent magnet 135 and its associated scanning element is a function of the electrical drive current $I_{DC}(t)$ supplied to the electromagnetic coil 128 during scanning operations. In general, the greater the level of drive current $I_{DC}(t)$ produced by scanner drive circuit 111, the greater the forces exerted on permanent magnet 135 and its associated scanning element, and in turn, the greater the resultant scan sweep angle $\alpha(t)$, and thus scan line length $L_{SL}$ produced by the laser scanning beam. Thus, scan sweep angle $\alpha(t)$ of the scanning module 105 can be directly controlled by controlling the level of drive current $I_{DC}(t)$ supplied to the coil 128 by the scanner drive circuit 111 under the control of the scan drive current control module 150A, shown in FIG. 2. This will be the preferred method of controlling the scan sweep angle $\alpha(t)$ and scan line length $L_{SL}$ in the present disclosure.

Preferably, the intensity detection module 141 is implemented within scan data processor/digitizer 107 which may be realized as an ASIC chip, supporting both analog and digital type circuits that carry out the functions and operations performed therein. The function of the intensity detection module 141 is manifold: (i) constantly process the return analog (or digital) scan data signals and detecting and analyzing the intensity (i.e. magnitude) of the laser return signal; (ii) determine (e.g. estimate) the range or distance of the scanned object, relative to the scanning window, during each measuring period; and (iii) transmit a range/distance indication signal (e.g. in the form of digital data value) to the system controller 150 for setting an appropriate scan sweep angle $\alpha(t)$ for the object to the scanned within the scanning field. Preferably, the range or distance of the scanned object can be determined (e.g. estimated), relative to the scanning window, during each measuring period, by making a relative signal-to-noise (SNR) measurement, where the lowest SNR value corresponds to the farthest possible scanning distance in the working range of the system (relative to the scanning window), and the highest SNR value corresponds to the shortest possible scanning distance in the working range of the system. Notably, module 141 may include tables storing pre-calibrated scanning range vs. SNR values which can be used in such range/distance determinations.

In general, system 100 supports a manually-triggered triggered mode of operation, and the bar code symbol reading method described below.

In response to the generation of a triggering event signal (i.e. by manually pulling trigger 104), the laser scanning module 105 generates and projects a laser scanning beam through the light transmission window 103, and across the laser scanning field external to the hand-supportable housing, for scanning an object in the scanning field. The laser scanning beam is generated by the laser beam source 112A in response control signals generated by the system controller 150. The scanning element (i.e. mechanism) 134 repeatedly scans the selected laser beam across a code symbol residing on an object in the laser scanning field 115, at the scan sweep angle set by the controller 150 for the current scanning cycle, determined by the process described in FIG. 3. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. The analog scan data signal processor/digitizer 107 processes the analog scan data signals and converts the processed analog scan data signals into digitized data signals. The programmed decode processor 108 decode processes digitized data signals, and generates symbol character data representative of each bar code symbol scanned by the laser scanning beam. The decoded bar code symbol could be a programming-type or menu-type bar code symbol, or an ordinary data-encoded bar code symbol not intended to perform or initiate any programming or special operations within the bar code symbol scanner.

Symbol character data, corresponding to the bar codes read (i.e. decoded) by the programmed decoder 108, is then transmitted to the host system 154 via the I/O communication interface 140, which may support either a wired and/or wireless communication link 155, well known in the art. During object detection and laser scanning operations, the system controller 150 generates the necessary control signals for controlling operations within the hand-supportable laser scanning bar code symbol reading system.

In general, system 100 supports a manually-triggered mode of operation, and a bar code symbol reading method described below.

In response to the manual actuation of trigger switch 104, the laser scanning module 105 generates and projects a laser scanning beam through the light transmission window 103, and across the laser scanning field 115 external to the hand-supportable housing, for scanning an object in the scanning field. The laser scanning beam is generated by the laser source 112B in response control signals generated by the system controller 150. The scanning element (i.e. mechanism) 134 repeatedly scans the laser beam across the object in the laser scanning field, at the scan sweep angle set by the controller 150 for the current scanning cycle, determined by the estimated/detected scanned object range, using the process described in FIG. 5. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. Within the analog scan data signal processor/digitizer 107, the intensity detection module 141 performs the following functions: (i) constantly processes the return analog (or digital) scan data signals; (ii) detects and analyzes the intensity (i.e. magnitude) of the laser return signal; (ii) determines (e.g. estimates) the range or distance of the scanned object, relative to the scanning window, during each measuring period; and (iv) transmits a range/distance indication signal (e.g. in the form of digital data values) to the controller 150 for setting an appropriate scan angle $\alpha(t)$ for the scanning assembly 110, based on the detected scanning distance.

The analog scan data signal processor/digitizer 107 also processes the analog scan data signal and converts the processed analog scan data signals into digitized data signals. The programmed decode processor 108 decode processes digitized data signals, and generates symbol character data representative of each bar code symbol scanned by the laser scanning beam. The decoded bar code symbol could be a programming-type or menu-type bar code symbol, or an ordinary data-encoded bar code symbol not intended to perform or initiate any programming or special operations within the bar code symbol scanner.

As indicated above, the scan angle $\alpha(t)$ of the laser scanning beam is determined by the range R(t) of the scanned object in the scan field, at any given moment in time. The range measure or estimate can be determined in at least two different ways: (i) by processing collected returned laser scan signals; or (ii) using range data produced by an LED or IR based object detection/range detection mechanism. In the case of processing return laser scanning signals, the laser light signal is converted to an electrical signal which is fed into module 141 in the analog scan data signal processor/digitizer 107. The strength of the processed analog or digital scan data signal, or the signal-to-noise ratio (SNR), is calculated and then used to estimate the distance/range of a scanned bar code symbol by the processor 107 which can be implemented an ASIC chip. A strong signal or a high ratio usually corresponds to a shorter range/distance, whereas a weak signal or low ratio corresponds to a larger range/distance. The scan angle $\alpha(t)$ of laser scanning beam can then be dynamically adjusted based on the signal strength or SNR, and a predetermined table/algorithm implemented in ASIC 107. Below is an exemplary table that is provided to illustrate the relationship among these three parameters, described above. The parameters can be tailored for scanners having different working ranges.

| Signal strength or SNR determined as a % of the predetermined Maximum strength or SNR value | Distance/Range R(t) between Scanner and a scanned bar code symbol | Scanning Angle $\alpha(t)$ Selected as a % of the full Laser scan line |
|---|---|---|
| 95% | 2 inch | $\alpha_1 = $ _____ degrees?? |
| ... | ... | ... |
| 50% | 1 foot | $\alpha_j = $ _____ degrees? |
| ... | ... | ... |
| 10% | 2 feet | $\alpha_N = $ _____ degrees? |

Notably, the dynamically-defined scan sweep angle $\alpha(t)$ can be triggered under conditions which may differ during different scanning application. As the scan sweep angle $\alpha(t)$ is a function of object scanning range R(t), which can and typically will vary at any instant in time during scanning operations, it is understood that the duration of the dynamically-programmed scan angle will also change over time, and be dependent on the object range/distance determined by the analog scan data processor/digitizer 107, as described above.

Symbol character data, corresponding to the bar codes read (i.e. decoded) by the decoder 108, is then transmitted to the host system 154 via the I/O communication interface 140, which may support either a wired and/or wireless communication link 155, well known in the art. During object detection and laser scanning operations, the system controller 150 generates the necessary control signals for controlling operations within the hand-supportable laser scanning bar code symbol reading system.

Figure 5:
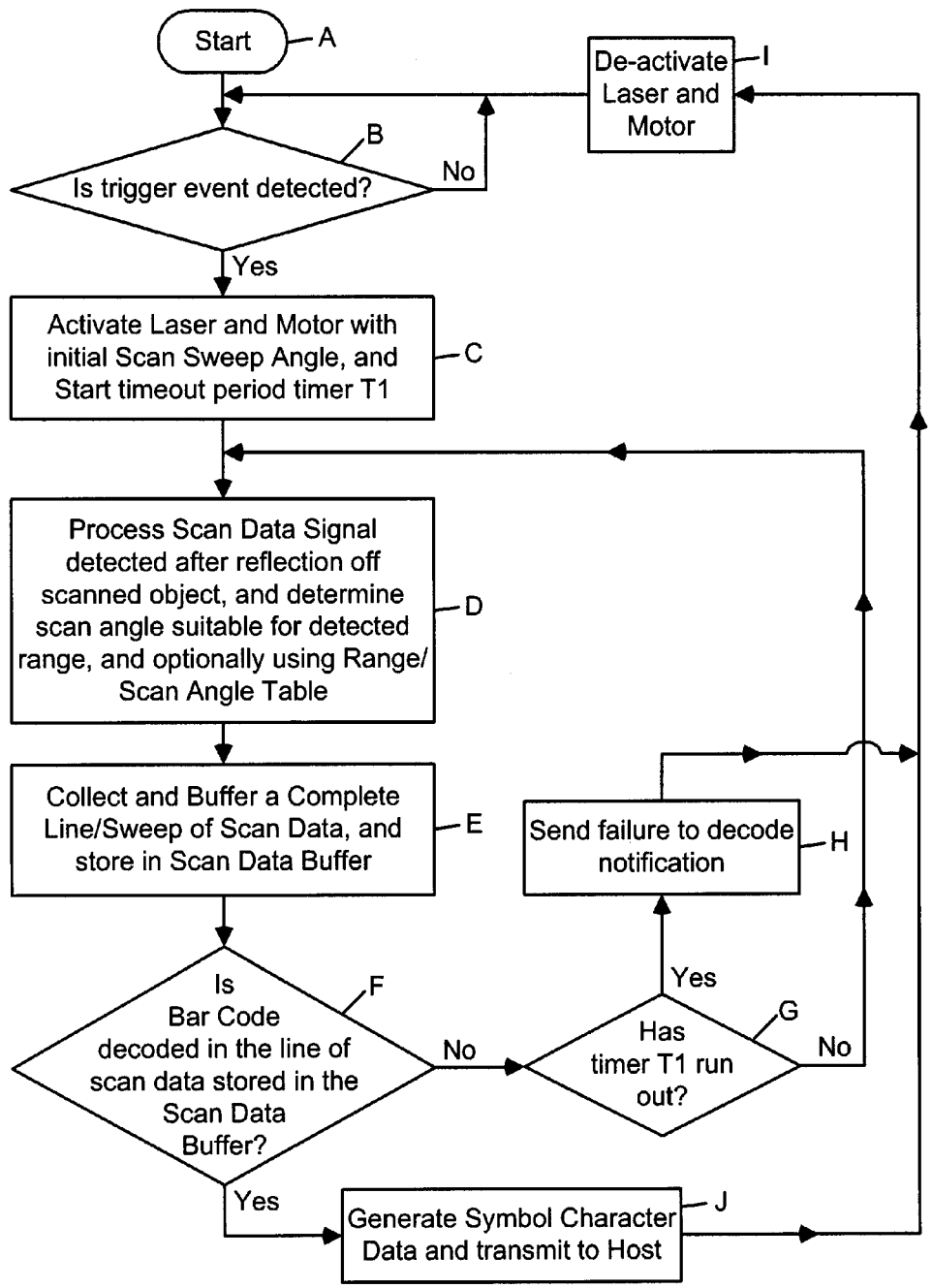
FIG. 5 sets forth a flow chart describing the primary steps carried out in the laser scanning bar code symbol reading system of FIG. 1, during each laser scanning object regardless of where the object is located within the scanning field of the system.

Referring to FIG. 5, the method of reading bar code symbols and controlling operations within the laser scanning bar code reader 100 will be described in greater detail.

As indicated in FIG. 5, the process orchestrated by system controller 150 begins at the START Block, where all system components are activated except for the laser and scanning motor (i.e. electromagnetic coil). Then at Block B in FIG. 5, the system controller determines if a trigger or activation event has occurred (i.e. trigger switch 104 has been manually depressed by the operator).

Figure 4:
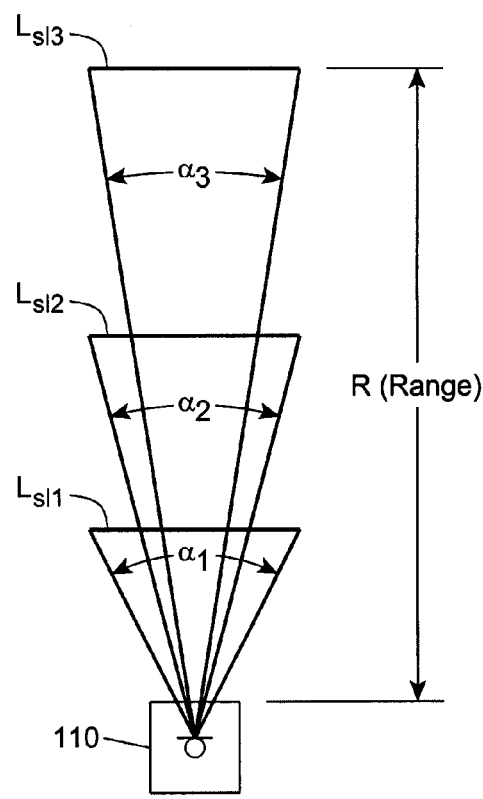
FIG. 4 is a schematic representation of VLD in the laser scanning bar code symbol reading system of FIG. 1, generating and projecting three different laser scanning beams onto a object at three different scanning distances or ranges, so that a relatively constant length laser scan line is projected onto the object independent of scanning distance, by sweeping the laser beam through a different scan angle based on the object scanning distance.

In the event that a trigger event has been detected at Block B in FIG. 4, then the system controller proceeds to Block C1, and (i) activates the laser diode, and scanner drive circuit 111 with a sufficient current to generate a full default scan sweep angle $\alpha_o(t)$ and (ii) then starts timeout period timer T1.

At Block C2 in FIG. 4, the analog scan data signal processor/digitizer ASIC 107 processes the return analog and/or digital scan data signals, and automatically (i) measures (e.g. estimates) the range or distance between the scanned object and the scanner, (ii) determines the scan sweep angle $\alpha(t)$ as a function of determined object range/distance R(t), and (iii) programs the scan sweep angle $\alpha(t)$ for the given moment of time during the control process.

As indicated at Block D in FIG. 4, the system controller commands the buffering, in a scan data buffer 160, a complete line of scan data collected for scanning directions, over a full scan sweep angle set during the current scanning cycle. Scan data from each scan direction is buffered in a different scan line data buffer.

At Block E in FIG. 4, the system controller determines whether the decode processor 108 has decoded a bar code symbol based on the line of scan collected and buffered in the scan data buffer 160.

If, at Block E, a bar code symbol has not been decoded (i.e. read) within the buffered line of scan data, then the system controller proceeds to Block F and determines whether or not the time out period T1 has been reached. If the time out period has not been reached, then the system controller returns to Block C2, processes the scan data signals, determines the object range and updates the scan sweep angle $\alpha(t)$. Thereafter, the system controller proceeds to Block D and attempts to collect and decode scan data within time period T1 remaining. If the time out period has been reached, then the system controller proceeds to Block G, de-activates the laser source and scan motor, and then returns to Block B, as shown.

By virtue of the novel control process described in FIG. 4 the bar code symbol reader has the capacity to dynamically adjust the time a visible laser scanning beam is actively emitted from the VLD 112A as the object bearing a bar code symbol is being scanned at different scanning distances or ranges, so as to maintain the scan line length projected onto the scanned object within predetermined limits during the bar code symbol reading process.

In some applications, the scan line length $L_{SL}$ can be maintained substantially constant on the scanned object regardless of the scanning distance R(t). In other embodiments, the scan line length $L_{SL}$ on the scanned object may be maintained substantially constant within predetermined limits for different detected ranges of scanning distance R(t).

Automatically-Triggered Hand-Supportable Laser Scanning Bar Code Symbol Reading System Employing Dynamically-Programmed Laser Scanning Angle Control Referring to FIGS. 6 through 10B, a third illustrative embodiment of an automatically-triggered hand-supportable laser scanning bar code symbol reading system 500 will be described in detail.

Figure 6:
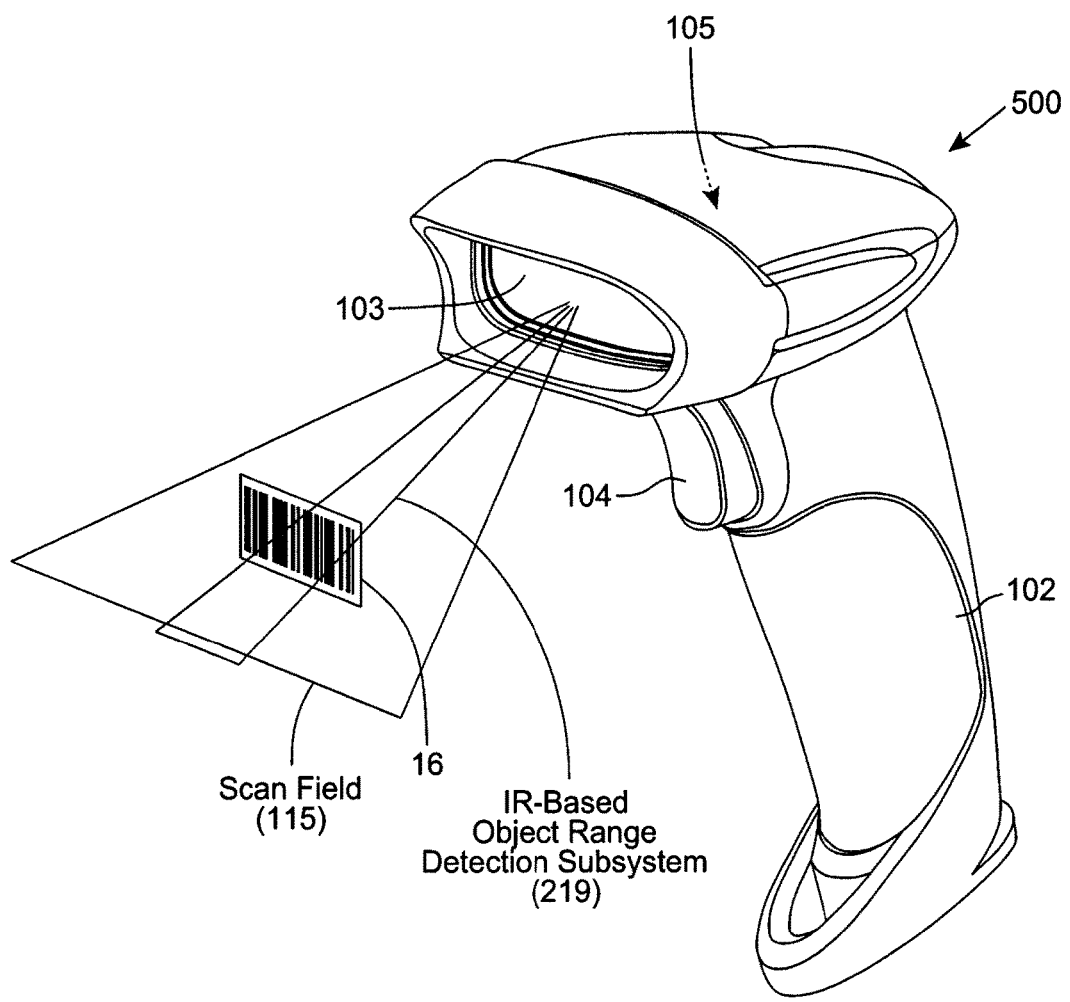
FIG. 6 is a perspective view of a second illustrative embodiment of an automatically-triggered hand-supportable dual-laser scanning bar code symbol reading system having the capacity to automatically control the length and intensity characteristics of a projected laser scan line from one of two laser sources, at any instant in time, in a manner dependent the detected location of the scanned object in the field of view of the system, during system operation.
Figure 7:
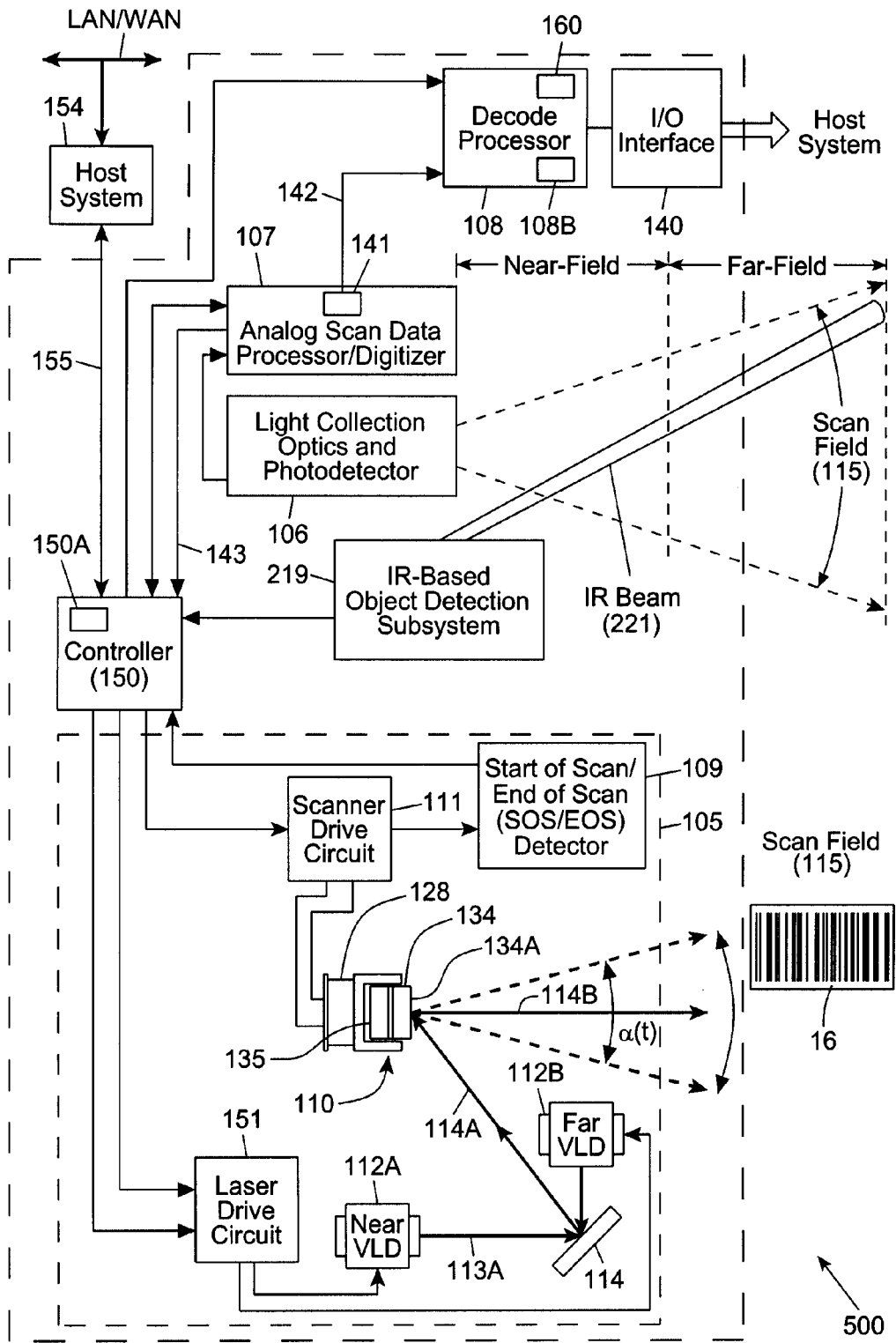
FIG. 7 is a schematic block diagram describing the major system components of the automatically-triggered dual-laser scanning bar code symbol reading system illustrated in FIG. 6.
Figure 8:
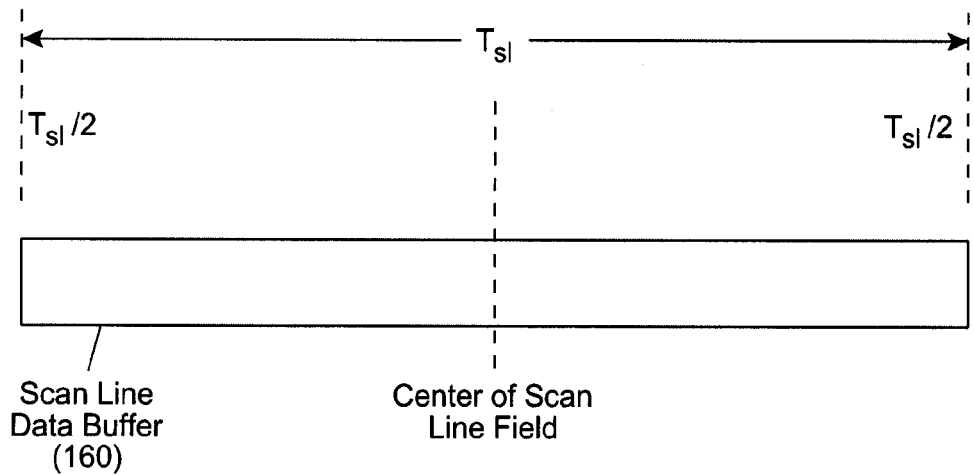
FIG. 8 is a schematic representation of a scan line data buffer maintained by the decode processor of the system of FIG. 6 during laser scanning operations, and holding a line of digital scan data for each laser scan direction during each laser scanning cycle.
Figure 9:
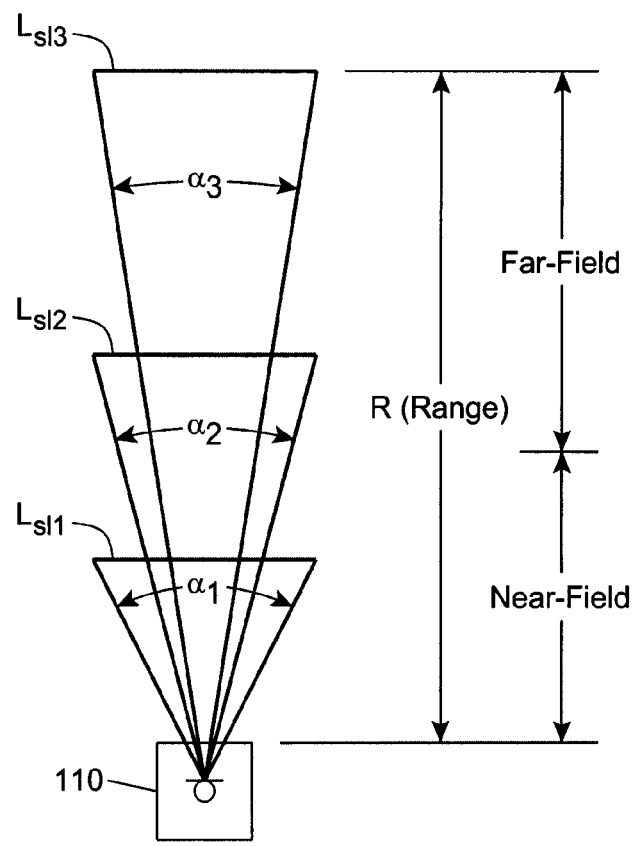
FIG. 9 is a schematic representation the dual-VLDs in the laser scanning bar code symbol reading system of FIG. 6, generating and projecting three different laser scanning beams onto a object at three different scanning distances or ranges, so that a relatively constant length laser scan line is projected onto the object independent of scanning distance, by sweeping the laser beam through a different scan angle based on the object scanning distance.

As shown in FIGS. 6 and 7, the automatically-triggered laser scanning bar code symbol reader 500 has a working distance, and an assembly of components comprising: a hand-supportable housing 102 having a head portion and a handle portion supporting the head portion; a light transmission window 103 integrated with the head portion of the housing 102; a IR-based (or LED-based) object detection and range subsystem 219 generating an IR or LED based light beam within the working range of the laser scanning field, as shown in FIG. 6, for automatically detecting the presence of an object in the laser scanning field, sending signals to the controller 150 so that the controller can trigger the system when an object is automatically detected in the scanning field and activate the near-field VLD 112A if the object is detected in the near-portion of the scanning field, or the far-field VLD 112B if the object is detected in the far-portion of the scanning field; a laser scanning module 105, for repeatedly scanning, across the laser scanning field, a visible laser beam generated by either (i) a first laser source 112A (e.g. VLD or IR LD) having near-field optics to produce a laser scanning beam 113A focused in the near-portion of the laser scanning field, or (ii) a second laser source 112B (e.g. VLD or IR LD) having far-field optics to produce a laser scanning beam 113B focused in the far-portion of the laser scanning field, in response to control signals generated by a system controller 150; wherein the laser scanning module 105 also includes a laser drive circuit 151 for receiving control signals from system controller 150, and in response thereto, generating and delivering different laser (diode) drive current signals to the laser source 112A, based on the detected or estimated distance or range of the scanned object in the scanning field; a start of scan/end of scan (SOS/EOS) detector 109, for generating timing signals indicating the start of laser beam sweep, and the end of each laser beam sweep, and sending these SOS/EOS timing signals to the system controller 150, as well as decode processor 108; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digital scan data signals, which are then converted into digital words representative of the relative width of the bars and spaces in the scanned code symbol structure and transmitted to decode processor 108 via lines 142; a set of scan line data line buffers 160 for buffering each complete line of scan data collected during a complete sweep of the laser scanning beam across the laser scanning field during each scanning cycle (i.e. for both scanning directions); programmed decode processor 108 for decode processing digitized data stored in said scan line data buffer 160, and generating symbol character data representative of each bar code symbol scanned by the laser scanning beam; a scan data signal intensity detection module 141, preferably implemented within scan data processor/digitizer 10, for continuously (i) processing the return analog (or digital) scan data signals generated by photo-detector 106, (ii) detecting and analyzing the intensity (i.e. magnitude) of the laser return signal, (iii) determining (e.g. estimating) the range or distance of the scanned object, relative to the scanning window, and then (iv) transmitting the range indication (i.e. estimation) signal (e.g. in the form of a digital data value) via lines 143 to the controller 150 so that it can program or set an appropriate scan angle $\alpha(t)$ for the scanning assembly 110 to controlled by the scanner drive circuit 111 by the amplitude of the drive current supplied to the electromagnetic coil 128; an input/output (I/O) communication interface module 140 for interfacing with a host communication system 154 and transmitting symbol character data thereto via wired or wireless communication links 155 that are supported by the symbol reader and host system 154; and a system controller 150 for generating the necessary control signals for controlling operations within the hand-supportable laser scanning bar code symbol reading system.

Preferably, IR-based (or VLD-based) object detection subsystem 219 is mounted in the front of its light transmission window 103 so that its IR light transmitter and IR light receiver components (or VLD light transmitter and receiver components) of subsystem 219 have an unobstructed view of an object within the laser scanning field of the system, as shown in FIG. 1. Also, the object presence detection module 219 can transmit into the scanning field 115, IR (or visible) signals having a continuous low-intensity output level, or having a pulsed higher-intensity output level, which may be used under some conditions to increase the object detection range of the system. In alternative embodiments, the IR light transmitter and IR light receiver components can be realized as visible light (e.g. red light) transmitter and visible light (e.g. red light) receiver components, respectively, well known in the art. Typically the object detecting light beam will be modulated and synchronously detected, as taught in U.S. Pat. No. 5,340,971, incorporated herein by reference.

As shown in FIG. 7, the laser scanning module 105 comprises a number of subcomponents, namely: laser scanning assembly 110 with an electromagnetic coil 128 and rotatable scanning element (e.g. mirror) 134 supporting a lightweight reflective element (e.g. mirror) 134A; a coil drive circuit 111 for generating an electrical drive signal to drive the electromagnetic coil 128 in the laser scanning assembly 110; and a laser beam source (i.e. near-VLD) 112A for producing a visible laser beam 113A focused in the near-portion of the scanning field, and laser beam source (i.e. far-VLD) 112B for producing a visible laser beam 113B focused in the far-portion of the laser scanning field; and a beam deflecting mirror 114 for deflecting the laser beam 113A as incident beam 114A towards the mirror component of the laser scanning assembly 110, which sweeps the deflected laser beam 114B across the laser scanning field and a bar code symbol 16 that might be simultaneously present therein during system operation.

As shown in FIG. 7, the laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 135) and which is driven by a scanner drive circuit 111 so that it generates magnetic forces on opposite poles of the permanent magnet 135, causing mirror component 134 to oscillate about its axis of rotation, during scanning assembly operation. Assuming the properties of the permanent magnet 135 are substantially constant, as well as the distance between the permanent magnet 135 and the electromagnetic coil 128, the force exerted on the permanent magnet 135 and its associated scanning element is a function of the electrical drive current supplied to the electromagnetic coil 128 during scanning operations. In general, the greater the level of drive current $I_{DC}(t)$ produced by scanner drive circuit 111, the greater the forces exerted on permanent magnet 135 and its associated scanning element, and in turn, the greater the resultant scan sweep angle $\alpha(t)$, and thus scan line length $L_{SL}$ produced by the laser scanning beam. Thus, scan sweep angle $\alpha(t)$ of the scanning module 105 can be directly controlled by controlling the level of drive current $I_{DC}(t)$ supplied to the electromagnetic coil 128 by the scanner drive circuit 111, under the control by scan drive current control module 150A, shown in FIG. 7. This will be the preferred method of controlling the scan sweep angle $\alpha(t)$ and scan line length $L_{SL}$ in the present disclosure.

Preferably, the intensity detection module 141 is implemented within the scan data processor/digitizer 107 which may be realized as an ASIC chip, supporting both analog and digital type circuits that carry out the functions and operations performed therein. The function of the intensity detection module 141 is manifold: (i) constantly process the return analog (or digital) scan data signals and detecting and analyzing the intensity (i.e. magnitude) of the laser return signal; (ii) determine (e.g. estimate) the range or distance of the scanned object, relative to the scanning window, during each measuring period; and (iii) transmit a range/distance indication signal (e.g. in the form of digital data value) to the controller 150 for setting an appropriate scan sweep angle dependent of the measured, detected or estimated distance or range of the scanned object.

Preferably, the range or distance of the scanned object can be determined (e.g. estimated), relative to the scanning window, during each measuring period, by making a relative signal-to-noise (SNR) measurement, where the lowest SNR value corresponds to the farthest possible scanning distance in the working range of the system (relative to the scanning window), and the highest SNR value corresponds to the shortest possible scanning distance in the working range of the system. Notably, module 141 may include tables storing pre-calibrated scanning range vs. SNR values which can be used in such range/distance determinations, R(t).

In general, system 500 supports an automatically-triggered mode of operation, and a method of bar code symbol reading as described below.

In response to the automatic detection of the object in the scanning field, the laser scanning module 105 generates and projects a laser scanning beam through the light transmission window 103, and across the laser scanning field 115 external to the hand-supportable housing, for scanning an object in the scanning field. Depending on where the object is detected within the scanning field, the laser scanning beam is generated by the laser source 112A or laser source 112B in response control signals generated by the system controller 150. The scanning element (i.e. mechanism) 134 repeatedly scans the laser beam 113A or 113B across the object in the laser scanning field, at the scan sweep angle set by the controller 150 for the current scanning cycle, determined by the estimated/detected scanned object range, using the process described below. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. Within the analog scan data signal processor/digitizer 107, the intensity detection module 141 performs the following functions: (i) constantly processes the return analog (or digital) scan data signals; (ii) detects and analyzes the intensity (i.e. magnitude) of the laser return signal; (ii) determines (e.g. estimates) the range or distance of the scanned object, relative to the scanning window, during each measuring period; and (iv) transmits a range/distance indication signal (e.g. in the form of digital data values) to the controller 150 for setting an appropriate scan angle α(t) for the scanning assembly 110, based on the detected scanning distance.

The analog scan data signal processor/digitizer 107 also processes the analog scan data signal and converts the processed analog scan data signals into digitized data signals. The programmed decode processor 108 decode processes digitized data signals, and generates symbol character data representative of each bar code symbol scanned by the laser scanning beam. The decoded bar code symbol could be a programming-type or menu-type bar code symbol, or an ordinary data-encoded bar code symbol not intended to perform or initiate any programming or special operations within the bar code symbol scanner.

As indicated above, the scan angle of the laser scanning beam is determined by the range R(t) of the scanned object in the scan field, at any given moment in time. The range measure or estimate R(t) can be determined in at least two different ways: (i) by processing collected returned laser scan signals; or (ii) using range data produced by an LED or IR based object detection/range detection mechanism. In the case of processing return laser scanning signals, the laser light signal is converted to an electrical signal which is fed into module 141 in the analog scan data signal processor/digitizer 107. The strength of the processed analog or digital scan data signal, or the signal-to-noise ratio (SNR), is calculated and then used to estimate the distance/range of a scanned bar code symbol by the processor 107 which can be implemented an ASIC (or FPGA) chip or other implementation technology. A strong signal or a high ratio usually corresponds to a shorter range/distance, whereas a weak signal or low ratio corresponds to a larger range/distance. The scan angle α(t) of laser scanning beam can then be dynamically adjusted based on the signal strength or SNR, and a predetermined table/algorithm implemented in ASIC 107. Below is an exemplary table that is provided to illustrate the relationship among these three parameters, described above. The parameters can be tailored for scanners having different working ranges.

| Signal strength or SNR determined as a % of the predetermined Maximum strength or SNR value | Distance/Range R(t) between Scanner and a scanned bar code symbol | Scanning Angle α(t) Selected as a % of the full Laser scan line |
|---|---|---|
| 95% | 2 inch | $α_1 =$ _____ degrees?? |
| ... | ... | ... |
| 50% | 1 foot | $α_j =$ _____ degrees? |
| ... | ... | ... |
| 10% | 2 feet | $α_N =$ _____ degrees? |

Notably, the dynamically-defined scan sweep angle α(t) can be triggered under conditions which may differ during different scanning application. As the scan sweep angle α(t) is a function of object scanning range R(t), which can and typically will vary at any instant in time during scanning operations, it is understood that the duration of the dynamically-programmed scan angle will also change over time, and be dependent on the object range/distance determined by the analog scan data processor/digitizer 107, as described above.

Symbol character data, corresponding to the bar codes read (i.e. decoded) by the decoder 108, is then transmitted to the host system 154 via the I/O communication interface 140, which may support either a wired and/or wireless communication link 155, well known in the art. During object detection and laser scanning operations, the system controller 150 generates the necessary control signals for controlling operations within the hand-supportable laser scanning bar code symbol reading system.

Figure 10A:
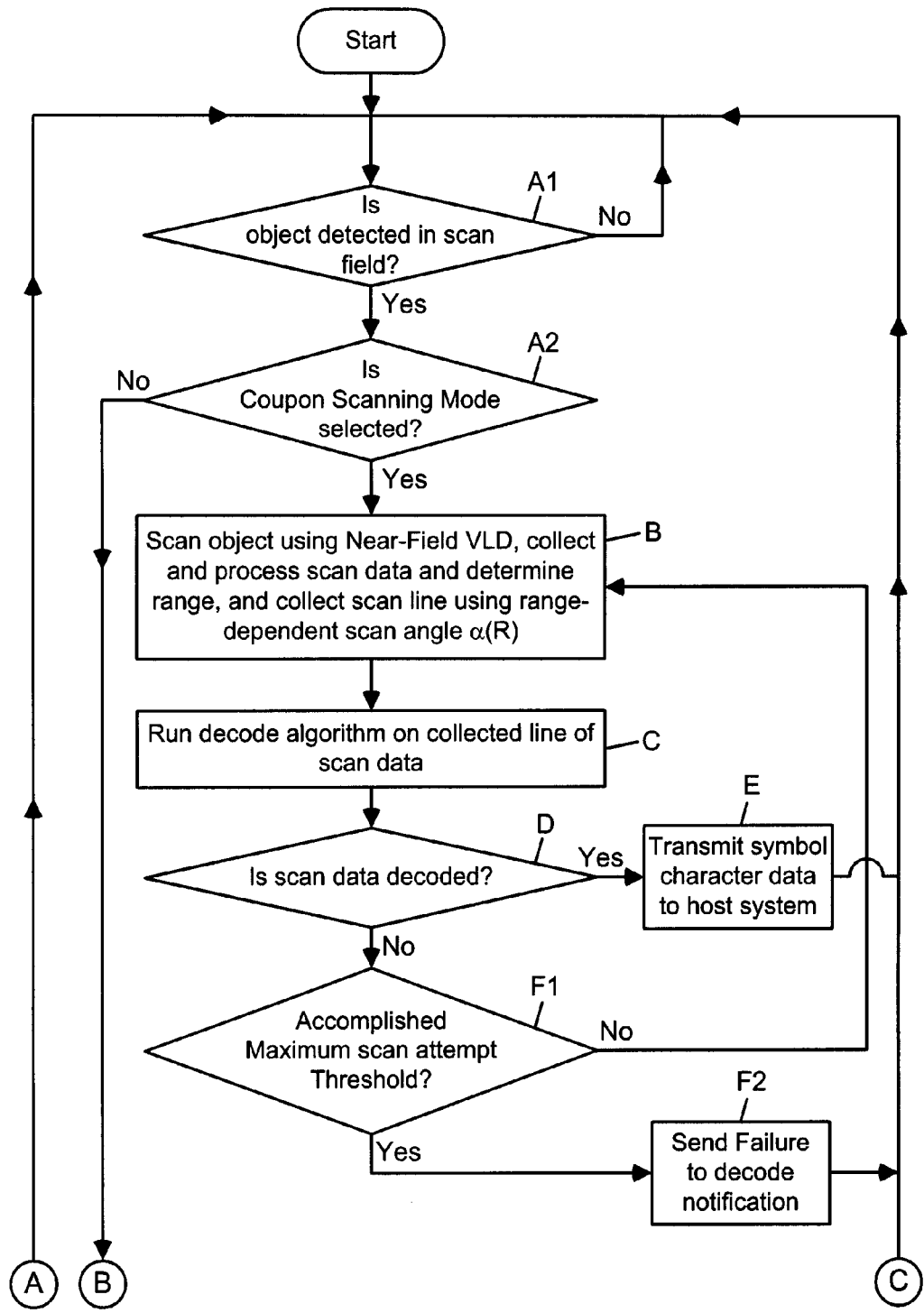
FIGS. 10A and 10B set forth a flow chart describing the primary steps carried out in the automatically-triggered laser scanning system of FIG. 6, during each laser scanning object, regardless of where an object is located within the scanning field thereof.

Referring to FIG. 10A, the method of reading bar code symbols and controlling operations within the laser scanning bar code reader 50 will be described in greater detail.

As indicated in FIG. 10A, the process orchestrated by system controller 150 begins at the START Block, where all system components are activated except for the laser and scanning motor (i.e. electromagnetic coil). Then at Block A1 in FIG. 10A, the system controller determines if an object is detected in the scan field. In the event that an object has been detected at Block A1, then the system controller proceeds to Block A2, and determines whether the detected object has been detected in the near-portion of the scanning field. If so, then at Block B, the system controller (i) activates the laser diode, and scanner drive circuit 111 with a sufficient current to generate a default scan sweep angle $\alpha_o(t)$ for the near-portion of the scanning field, (ii) then starts timeout period timer T1, (iii) scans the object using the near-field VLD, (iv) collects and processes scan data to determine the range or distance of the scanned object from the scanning window, and (v) and then sets the scan angle for the measured or estimated range, and then collects and processes a line of scan data from the object at the detected range. The system controller commands buffering, in the scan data buffer 160, a complete line of scan data collected for scanning directions, over a full scan sweep angle set during the current scanning cycle. Scan data from each scan direction is buffered in a different scan line data buffer. At Block C, the decode processor runs a decode algorithm on the collected and buffered line of scan data.

At Block D, the system controller determines whether the decode processor 108 has decoded a bar code symbol based on the line of scan collected and buffered in the scan data buffer 160. If, at Block D, a bar code symbol has been decoded (i.e. read) within the buffered line of scan data, then at Block E, the system controller transmits symbol character data to the host system, and returns to Block A1. If, at Block D, a bar code symbol has not been decoded (i.e. read) within the buffered line of scan data, then at Block F1 the system controller determines whether or not the time out period T1 has been reached (i.e. maximum scan threshold has been reached or accomplished). If the time out period has not been reached, then the system controller returns to Block B, processes the scan data signals, determines the object range and updates the scan angle of the laser scanning beam, and attempts to collect and decode scan data within time period T1 remaining. If the time out period has been reached, then the system controller proceeds to Block F2, sends a failure to decode notification, and can de-activate the laser source and scan motor (if programmed to do so), and then returns to Block A1, as shown.

If at Block A2 in FIG. 10A, the detected object is not detected within the near-portion of the scanning field, then the system controller proceeds to Block G, and controller (i) (re)activates the laser diode, and scanner drive circuit 111 with a sufficient current to generate a default scan sweep angle $\alpha_o(t)$ for the far-portion of the scanning field, (ii) starts timeout period timer T1, (iii) scans the object using the far-field VLD, (iv) collects and processes scan data to determine the range or distance R(t) of the scanned object from the scanning window, and (v) and then sets the scan angle $\alpha(t)$ for the measured or estimated range, and then collects and processes a line of scan data from the object at the detected range. The system controller commands buffering, in the scan data buffer 160, a complete line of scan data collected for scanning directions, over a full scan sweep angle set during the current scanning cycle. Scan data from each scan direction is buffered in a different scan line data buffer. At Block H, the decode processor runs a decode algorithm on the collected and buffered line of scan data.

At Block I, the system controller determines whether the decode processor 108 has decoded a bar code symbol based on the line of scan collected and buffered in the scan data buffer 160. If, at Block I, a bar code symbol has been decoded (i.e. read) within the buffered line of scan data, then at Block J, the system controller transmits symbol character data to the host system, and returns to Block A1. If, at Block I, a bar code symbol has not been decoded (i.e. read) within the buffered line of scan data, then at Block K the system controller determines whether or not the time out period T1 has been reached (i.e. maximum scan threshold has been reached or accomplished). If the time out period has not been reached, then the system controller returns to Block G, processes the scan data signals, determines the object range and updates the scan angle of the laser scanning beam, and attempts to collect and decode scan data within time period T1 remaining. If the time out period has been reached, then the system controller proceeds to Block L, sends a failure to decode notification, and can de-activate the laser source and scan motor (if programmed to do so), and then returns to Block A1, as shown.

Figure 10B:
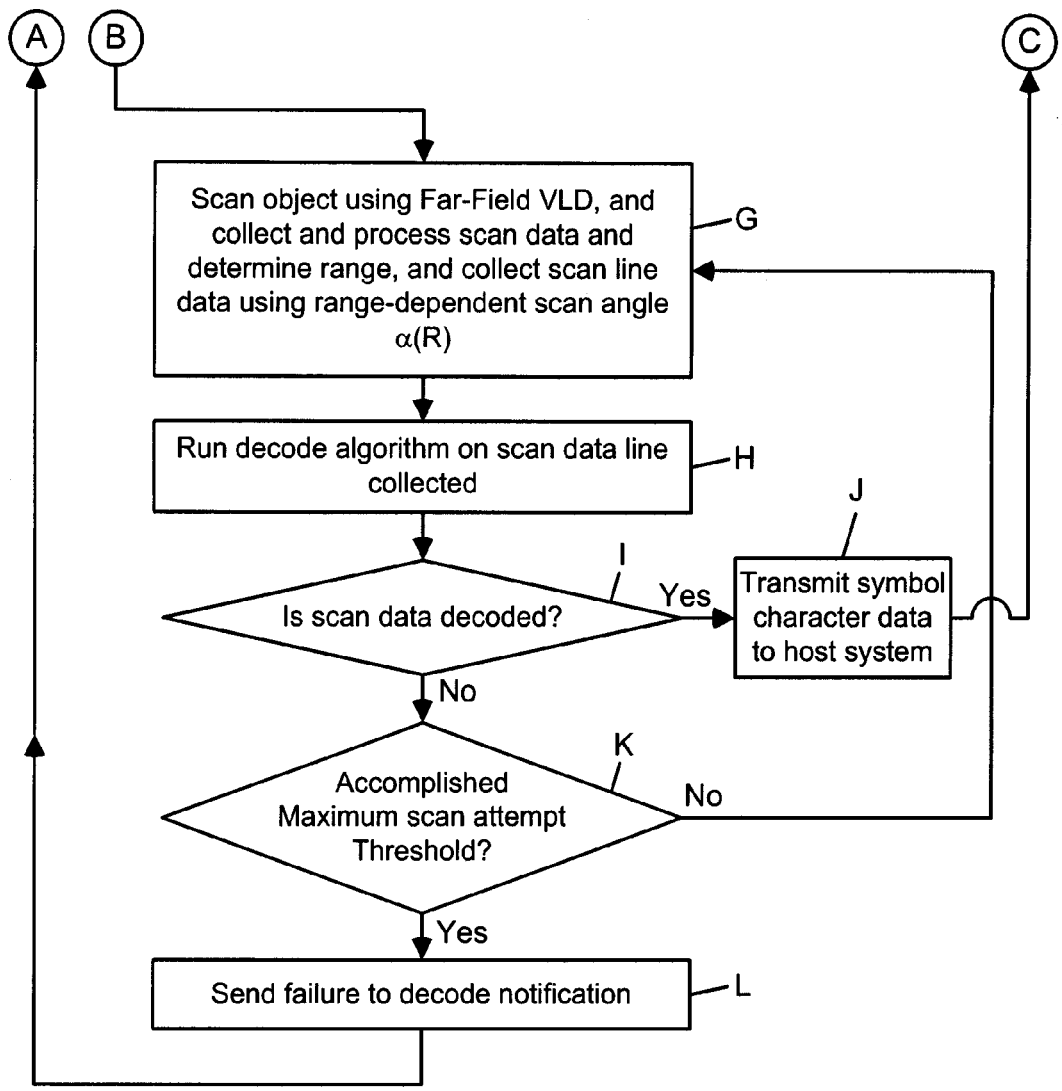

By virtue of the novel control process described in FIGS. 10A and 10B the bar code symbol reader has the capacity to dynamically adjust the time a visible laser scanning beam is actively emitted from VLDs 112A or 112B as the object bearing a bar code symbol is being scanned at different scanning distances or ranges, so as to maintain the scan line length projected onto the scanned object within predetermined limits during the bar code symbol reading process. In some applications, the scan line length $L_{SL}$ can be maintained substantially constant on the scanned object regardless of the scanning distance R(t). In other embodiments, the scan line length $L_{SL}$ on the scanned object may be maintained substantially constant within predetermined limits for different detected ranges of scanning distance R(t).

Some Modifications which Readily Come to Mind

While the illustrative embodiments disclosed the use of a 1D laser scanning module to detect visible and/or invisible bar code symbols on objects, it is understood that a 2D or raster-type laser scanning module can be used as well, to scan 1D bar code symbols, 2D stacked linear bar code symbols, and 2D matrix code symbols, and generate scan data for decoding processing.

While an illustrative range of scan angles have been disclosed herein for hand-held scanning applications, it is understood that other values can be used as required by the end-user application.

While hand-supportable laser scanning systems have been illustrated, it is understood that these laser scanning systems can be packaged in a portable or mobile data terminal (PDT) where the laser scanning engine begins to scan in response to receiving a request to scan from the host computer 154 within the PDT. Also, the laser scanning system can be integrated into modular compact housings and mounted in fixed application environments, such as on counter-top surfaces, on wall surfaces, and on transportable machines such as forklifts, where there is a need to scan code symbols on objects (e.g. boxes) that might be located anywhere within a large scanning range (e.g. up to 20+ feet away from the scanning system). In such fixed mounted applications, the trigger signal can be generated by manual switches located a remote locations (e.g. within the forklift cab near the driver) or anywhere not located on the housing of the system.

Also, the illustrative embodiment have been described in connection with various types of code symbol reading applications involving 1-D and 2-D bar code structures (e.g. 1D bar code symbols, 2D stacked linear bar code symbols, and 2D matrix code symbols), it is understood that the present invention can be used to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol" shall be deemed to include all such information carrying structures and other forms of graphically-encoded intelligence.

It is understood that the digital-imaging based bar code symbol reading system of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope of the Claims appended hereto.

What is claimed is:

1. A method of reading code symbols using a laser scanning code symbol reading system having a working distance, said method comprising the steps of:
   (a) supporting, adjacent an object with a code symbol, a hand supportable laser scanning code symbol reading system having a scan line data buffer;
   (b) estimating a distance of said object from said reading system, and generating data representative of said estimated distance;
   (c) projecting a laser scanning beam, wherein the laser scanning beam is swept through a scan angle while maintaining a constant scan line length projected onto said object scanned by the laser scanning beam as the estimated distance of said object from said laser scanning code symbol reading system changes over time;
   (d) detecting the intensity of laser light reflected/scattered from a scanning field of said laser scanning code symbol reading system during the scan sweep of the laser scanning beam across said scanning field and any object in said scanning field, and generating a scan data signal representative of the detected laser light;
   (e) collecting a line of scan data over a sweep of the laser beam across the scanning field and any object therein, and buffing the collected line of scan data; and
   (f) decode processing said line of scan data collected and buffered in step (e) in an attempt to read any code symbol represented in said line of scan data, and when a code symbol is read within said line of scan data, then generating and transmitting symbol character data, corresponding to said decoded code symbol, to an intended destination.

2. A laser scanning code symbol reading system, comprising:
   a housing with a light transmission window;
   a laser scanning module, disposed in said housing, for scanning, during each scanning cycle, a laser beam across a laser scanning field defined external to said symbol reading system, and along a laser scan line on a scanned object in said laser scanning field;
   light collection optics, disposed in said housing, for collecting light reflected/scattered from the scanned object in said laser scanning field;
   a photo-detector, disposed in said housing, for detecting the intensity of collected light from said laser scanning field, and generating an analog scan data signal corresponding to said detected light intensity during laser scanning operations, during each said scanning cycle;
   a scan data signal processor, disposed in said housing, for processing said generated analog scan data signal, and generating a line of scan data for each said scanning cycle;
   wherein said scan data signal processor further includes a module for processing said analog scan data signal so as to automatically detect whether an object is present in a near-portion of said scanning field or a far-portion of said scanning field, wherein said module of said scan data signal processor is configured to estimate the distance of the object in said laser scanning field from said symbol reading system, and generate data representative of said estimated distance;
   wherein said laser scanning module further projects said laser scanning beam through said light transmission window, comprising the laser scanning beam having a scan angle;
   a scan data buffer, disposed in said housing, for buffering each said line of scan data during each said scanning cycle;
   a programmed processor, disposed in said housing, for processing each said line of scan data buffered in said scan data buffer during each said scanning cycle to decode any code symbol represented in said scan data, and generate symbol character data representative of said decode code symbol, and transmitting said symbol character data to an intended destination; and
   a system controller, disposed in said housing, for controlling operations within said laser scanning code symbol reading system to maintain a length of the laser scan line projected onto the scanned object within predetermined limits as the estimated distance of the scanned object from said laser scanning code symbol reading system changes over time, wherein said laser scanning code symbol reading system comprises a near-field laser source and a far-field laser source, and said system controller is configured to
      activate said near-field laser source in response to detecting that the object is present in the near-portion of said scanning field, and
      activate said far-field laser source in response to detecting that the object is present in the far-portion of said scanning field.

3. The laser scanning code symbol reading system of claim 2, wherein the length of the scan line projected onto the object scanned by the laser scanning beam is substantially constant for a range of object distances from the symbol reading system, over a substantial portion of the working range of said laser scanning code symbol reading system.

4. The laser scanning code symbol reading system of claim 2, wherein the length of the scan line projected onto the object scanned by the laser scanning beam is substantially constant for a range of object distances from the symbol reading system, over a limited portion of the working range of said laser scanning code symbol reading system.

5. The laser scanning code symbol reading system of claim 2, wherein said code symbols are symbols selected from the group consisting of 1D bar code symbols, 2D stacked linear bar code symbols and 2D matrix code symbols.

6. The laser scanning code symbol reading system of claim 2, wherein said laser scanning modules comprises a scanner current drive circuit to supply different levels of drive current to an electromagnetically-driven scanning mechanism to achieve said scan angles in response to said distances.

7. The laser scanning code symbol reading system of claim 2, which further comprises:
   an input/output (I/O) communication interface, disposed in said housing, for interfacing with a host system and transmitting symbol character data to said host system, via a communication link.

8. The laser scanning bar code symbol system of claim 7, wherein said communication link is either a wired or wireless communication link.

9. The laser scanning bar code symbol reading system of claim 2, wherein said housing is a hand-supportable housing.

10. The laser scanning code symbol reading system of claim 2, wherein:
- said module for estimating the distance of an object in said laser scanning field from said light transmission window is configured so that the processing of said generated scan data signal representative of the detected laser light is comprised of calculating a signal-to-noise ratio of said generated scan data signal representative of the detected laser light; and
- said system controller is configured to adjust said scan angle based on the calculated signal-to-noise ratio of said generated scan data signal representative of the detected laser light.

11. The laser scanning code symbol reading system of claim 2, wherein said laser scanning code symbol reading system is configured to adjust said scan angle over time as a function of said estimated distance, or said data representative of said estimated distance, to maintain the length of the laser scan line projected onto the scanned object within said predetermined limits.

12. A method of reading code symbols using a laser scanning code symbol reading system having a working distance, said method comprising the steps of:
- (a) supporting, adjacent an object with a code symbol, a hand-supportable laser scanning code symbol reading system having a scan line data buffer;
- (b) automatically detecting whether said object is present in a near-portion of a scanning field or a far-portion of said scanning field, comprising estimating a distance of said object from said symbol reading system, and generating data representative of said estimated distance;
- (c) projecting a laser scanning beam, wherein the laser scanning beam is swept through a scan angle while maintaining a scan line length projected onto said object scanned by the laser scanning beam within predetermined limits as the estimated distance of said object from said laser scanning code symbol reading system changes over time, wherein said laser scanning code symbol reading system comprises a near-field laser source and a far-field laser source, and wherein step (c) comprises:
  - activating said near-field laser source in response to detecting that said object is present in said near-portion of said scanning field, and
  - activating said far-field laser source in response to detecting that said object is present in said far-portion of said scanning field;
- (d) detecting the intensity of laser light reflected/scattered from said scanning field of said laser scanning code symbol reading system during the scan sweep of the laser scanning beam across said scanning field and any object in said scanning field, and generating a scan data signal representative of the detected laser light;
- (e) collecting a line of scan data over a sweep of the laser beam across the scanning field and any object therein, and buffering the collected line of scan data; and
- (f) decode processing said line of scan data collected and buffered in step (e) in an attempt to read any code symbol represented in said line of scan data, and when a code symbol is read within said line of scan data, then generating and transmitting symbol character data, corresponding to said decoded code symbol, to an intended destination.

13. The method of claim 12, wherein the length of the scan line projected onto the object scanned by the laser scanning beam is substantially constant for a range of object distances from the symbol reading system, over a substantial portion of the working range of said laser scanning code symbol reading system.

14. The method of claim 12, wherein the length of the scan line projected onto the object scanned by the laser scanning beam is substantially constant for a range of object distances from the symbol reading system, over a limited portion of the working range of said laser scanning code symbol reading system.

15. The method of claim 12, wherein said code symbols are symbols selected from the group consisting of 1D bar code symbols, 2D stacked linear bar code symbols and 2D matrix code symbols.

16. The method of claim 12, wherein step (c) comprises using a scanner current drive circuit to supply different levels of drive current to an electromagnetically-driven scanning mechanism to achieve said scan angles in response to said distances estimated in step (b).

17. The method of claim 12, comprising:
- calculating a signal-to-noise ratio of said generated scan data signal representative of the detected laser light; and
- adjusting said scan angle based on the calculated signal-to-noise ratio of said generated scan data signal representative of the detected laser light.

18. The method of claim 12, wherein step (b) comprises estimating the distance of an object in said scanning field from said laser scanning code symbol reading system, by processing said generated scan data signal representative of the detected laser light.

19. The method of claim 12, wherein said scan line length projected onto the object scanned is maintained within said predetermined limits by adjusting said scan angle.

20. The method of claim 12, wherein said scan line length projected onto the object scanned is maintained by adjusting emission time of the laser scanning beam.

* * * * *